July 14, 1964　　A. ALEXANDER ETAL　　3,140,607
REGISTER FOR GAS METERS

Filed Dec. 19, 1961　　2 Sheets-Sheet 1

Inventors
Arthur Alexander
Herbert William Clements
By Alvin Browdy
Attorney

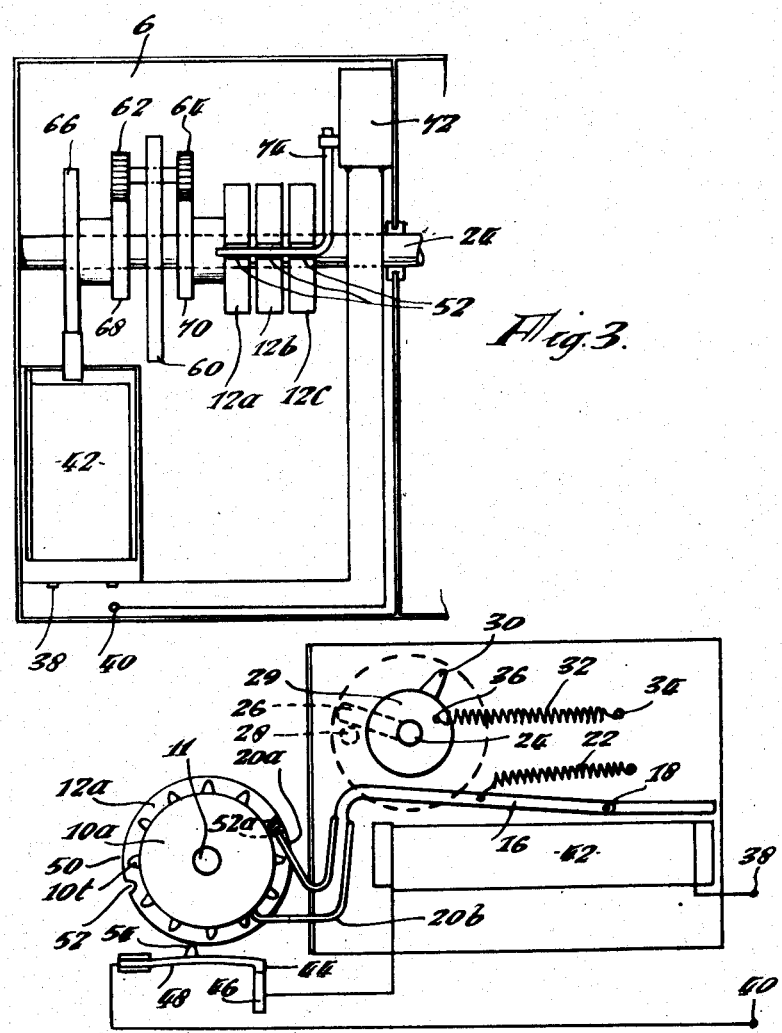

United States Patent Office 3,140,607
Patented July 14, 1964

3,140,607
REGISTER FOR GAS METERS
Arthur Alexander and Herbert William Clements, both of Sale, England, assignors to Parkinson Cowan Limited, London, England, a company of Great Britain and Northern Ireland
Filed Dec. 19, 1961, Ser. No. 160,607
Claims priority, application Great Britain Dec. 19, 1960
10 Claims. (Cl. 73—272)

This invention relates to apparatus for reading fluid meters and is particularly concerned with means which enable such readings to be taken from a remote position.

It has been recognised that considerable advantages in terms of time, cost and convenience can result if readings of consumers' meters can be taken without entering their premises. However, if the meter itself is installed out of doors, it is exposed to extreme climatic conditions which affect its accuracy and may cause corrosion. In a known form of remote index indication, a pneumatic link is used between the meter and an indicator but in this case the mechanism of this indicator is subjected to these undesirable conditions.

According to the present invention there is provided a fluid meter arranged to be read from a remote position comprising a counting device mounted on said meter and driven therefrom and, connected to said counting device, electrical means which, when energised, return the counting device to a zero position. The counting device is preferably mechanically driven from the meter.

Figure 1:
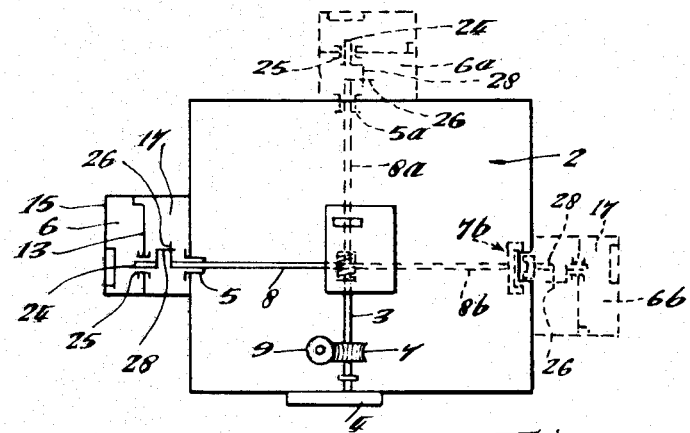
Figure 4:
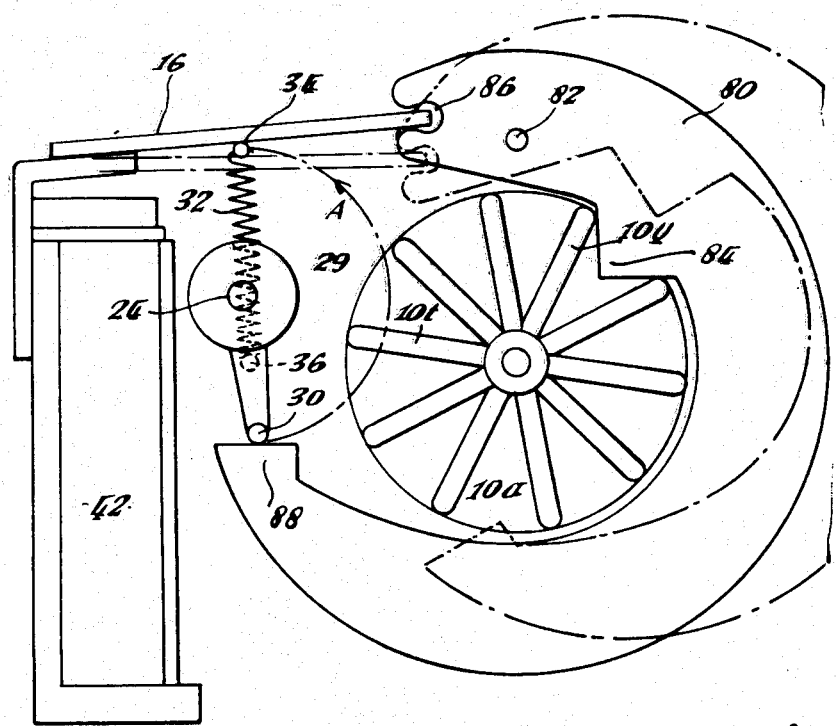

Embodiments of the invention will now be more particularly described with reference to the accompanying drawings wherein, FIG. 1 is a diagrammatic plan view of a dry gas meter showing alternative positions of a counting device, FIG. 2 is an elevation of one form of a counting device, FIG. 3 is an elevation of another form of counting device, and FIG. 4 is an elevation of a third form of counting device.

Referring to FIG. 1 of the drawings, a dry gas meter 2 is shown with a conventional meter index 4 on its front face driven by an index shaft 3. A counting device is mounted in a sealed compartment having end faces 13, 15 the sides being extended beyond the end face 15 so that the compartment 6 can be attached to the meter, leaving a space 17 between the end face 15 and the meter 2. Two further possible alternative positions for the compartment 6 are shown at 6a and 6b. In two alternative positions, those at the left-hand side and at the top of the figure, the counting device is driven from the gas meter mechanism by drive shafts 8 and 8a respectively which pass through stuffing boxes 5, 5a respectively on the casing of the meter 2. Other positions may, of course, be chosen for the location of the counting device, e.g. it may be mounted on top of the meter and be driven by the index shaft 3 through a worm 7 and wheel 9, but wherever it is placed, it is preferable that it be in a sealed compartment so as to prevent entry of gas from the meter or moisture from the surrounding atmosphere. To this end, it may be preferable to provide a magnetic drive to avoid any problem of sealing the compartment from the meter. This is instanced by the arrangement 7b driven by shaft 8b. The drive shaft 8 is suitably geared to the metering mechanism of the meter so that it makes, for example, one revolution per hundred cubic feet of gas passed. Alternatively, if the thermal value of the gas can be assumed to be a constant figure, the gearing may be arranged to give a reading of the heat value of the gas passed.

One form of counting device is shown in FIG. 2. It contains a counting mechanism of known form comprising a series of counting elements one of which is shown at 10a rotatable on a common axis 11, and so connected that each complete revolution of a preceding element causes 1/10 of a revolution of its succeeding element. The rotation of the first element of the series is controlled by an arm 16 pivotable about an axis 18 carrying a pair of detents 20a, 20b engaging teeth 10t in the element 10a and urged upwardly by a tension spring 22. The element 10a is provided with a detent arrangement (not shown) so that it can only turn anti-clockwise. When the arm 16 is depressed against the force of the spring 22, the detent 20a trips over the tooth 10t below it, and, on the return movement of the arm 16, the element 10a is rotated in the counterclockwise direction through the angle subtended by two adjacent teeth. Such known forms of drive as a typical clock escapement fork or standard electrical relays can also be used to rotate the element 10a.

A shaft 24 coaxial with the driving shaft 8 extends from the sealed compartment 6 through a stuffing box 25 (FIG. 1) into the space 17. The drive shaft 8 carries an arm 26 which can engage an eccentric pin 28 on the shaft 24 and thus cause it to rotate in the anti-clockwise direction with the drive shaft 8. At the further end of the shaft 24 a disc 29 carrying a radial abutment 30 is fixed to it and this abutment contacts the arm 16 once each revolution, depressing it, and thus operating the counting mechanism. The drive shaft 8 rotates relatively slowly; in order to prevent the arm 16 being held down for an appreciable part of each cycle, a tension spring 32 is fixed at one end 34 and attached at the other end 36 to the disc 29 so that as the abutment moves downwardly from the 9 o'clock position it is pulled by the spring past its lowermost position thus causing a quick reciprocating movement of the arm 16. The drive from the drive shaft 8 is thus interrupted and is taken up again as the arm 26 contacts the eccentric pin 28 once more.

For the purpose of reading the meter, an electrical circuit is provided comprising terminals 38, 40 solenoid 42, a contact point 44 attached to a resilient contact arm 48 and a fixed contact point 46 co-operating therewith. Each of the counting elements 10a, 10b and 10c has fixed to it a cam as exemplified by the cam 12a of the element 10a. Each cam has a circular circumference 50 and a depression 52 at one point thereon. An elongated probe 54 (seen in end view in FIG. 2) is fixed to the resilient contact arm 48 and runs across the cams 12 the natural resilience of the arm 48 urging the probe 54 against the cams. When the probe rests upon the circumferences 50 of the cams the contact points 44, 46 are closed and when it enters the depressions 52 these points are opened.

With the contact points 44, 46 closed, an electrical impulse applied to the terminals 38, 40 will energise the solenoid 42 and so operate the arm 16. When the contact points are opened, the circuit is broken and the solenoid 42 cannot be energised. It will be appreciated that the contact points 44, 46 will only be opened when the depressions 52 are all in line and opposite the probe 54. This position defines the zero position of the counting device.

When the device is in operation, it will initially be set to its zero position and the amount of gas used by the consumer will be recorded by movement of the counting elements through the rotation of the shaft 24 in the manner hereinbefore described. When the supplier wishes to determine the amount of gas that has been used, a number of electrical impulses are applied to the solenoid which actuates the counting mechanism that number of steps. The impulses are continued until, eventually the mechanism reaches its zero position, the circuit is broken and no further impulses can be applied through the solenoid. Thus, by recording the number of impulses it has been necessary to apply to reach this position, a measure may be obtained of the amount of gas used and the device, at the same time, automatically re-set in preparation for the next reading.

An alternative form of counting device is shown in FIG. 3. Parts identical to those referred to in the foregoing description are indicated by the same reference numbers. In this embodiment, a differential gear is used, the shaft 24 of which is driven in the manner hereinbefore described, the shaft having fixed to it a planet carrier 60 with planet wheels 62, 64. The mechanism also includes a gear 66 fixed to a first sunwheel 68 and a second sunwheel 70 fixed to the cam 12a of the first counting element (not shown), this cam and the cams 12b, 12c of successive elements all being freely rotatable on the shaft 24.

The electrical circuit in this embodiment has the terminals 38, 40 and solenoid 42 as before, but in place of the contact points it may be provided with a micro-switch 72 operated through a crank 74. The crank contacts the cams 12a, 12b, 12c and, when co-incident with the depressions 52 in all the cams, i.e. when the device is at its zero position, it is deflected by them to open the micro-switch 72.

The gear 66 is held fast between readings by means of a suitable arrangement (not shown), such as that shown in FIG. 2 comprising the arm 16 with the detents 20a, 20b and tension spring 22. The shaft 24 therefore rotates the second sunwheel 70 through the planet gear 64 to operate the counting elements and their cams. As in the earlier described embodiment, when a reading is taken, a series of electrical impulses are applied to the solenoid, the gear 66 is rotated and moves the counting elements and cams until the zero position is reached.

FIG. 4 illustrates a third form of counting device which is arranged to be actuated in the reverse direction when a reading is taken. As in the mechanism shown in FIG. 2, the drive from the meter is transmitted through the shaft 24 and its associated disc 29 and radial abutment 30, which is the anti-clockwise rotation shown by arrow A. Similarly to the mechanism in FIG. 2, the spring 32, fixed at 34 and 36 pulls the radial abutment 30 upwards relatively quickly as it rotates, during which upward movement it engages a tooth 10t to turn the wheel through an angle in the clockwise direction.

Rocker member 80 is shown in full lines in its rest position on fixed pivot 82, the wedge portion 84 of the member seating between two adjacent teeth. As the radial abutment 30 moves upwards and engages a tooth 10t and the wheel 10a is thereby rotated, the wedge 84 is urged outwardly by the movement of tooth 10u. When the abutment 30 disengages from its tooth 10t, the tooth 10u has passed the apex of the wedge 84 and the rocker member pivots about 82 under its own weight to return to its rest position, so that the wedge 84 completes the movement of the wheel through one tenth of a revolution as it pushes the tooth 10u to enter the space between that and its succeeding tooth. The wheel 10a is thus correctly positioned after each movement.

As in the form of device shown in FIG. 2, electrical impulses applied to the solenoid 42 operate the arm 16 to return the counting device to its zero position. A slot 86 in the rocker member 80 receives the end of the arm 16 so that, as each impulse is applied, the resulting depression of the arm 16 rocks the member 80 about its pivot 82 to the position shown in dotted lines. The first part of the movement will withdraw the wedge 84 from the wheel, and further downwards movement of the arm 16 will draw abutment 88 across the wheel to contact an adjacent tooth and rotate the wheel in the reverse direction to the rotation produced by the abutment 30. As before the movement of the wheel will be somewhat less than one tenth of a revolution, the reseating of the wedge 84 after withdrawal of the abutment 88 completing the movement and insuring that the wheel is correctly positioned.

When installing a meter according to the invention, the counting device terminals 38, 40 may be linked to any convenient place from which the readings may be taken. The meter reader will carry an indicator recorder which can be connected to these terminals and pulses to operate the counting device are generated by a transistor oscillator energised from a battery in the recorder. These pulses also operate a set of indicating and recording counters forming a register in the recorder so that, when the circuit is finally broken by the device reaching its zero position, the indicator recorder will register the quantity of gas consumed. A switch on the instrument enables the recorder counters to be returned to their zero positions after each reading.

It will be appreciated that, if the counting device in the meter is actuated in a forward direction, the number of impulses required to re-set the device to zero is equivalent to the amount by which the gas consumed falls short of the maximum reading on the counting device. By arranging for the register in the recorder to step backwards instead of forwards at each impulse the register will give a direct reading of the gas consumed. The counting device shown in FIG. 2 is always actuated in a forward direction; that shown in FIG. 4 is actuated in a backward direction but that shown in FIG. 3 could be actuated either forwards or backwards by the impulses from the indicator recorder. If the register is to be actuated in the backwards direction, the recorder register will step forwards at each impulse.

If the counting device is operated in a forward direction by the indicator recorder, it may be found that the the counting device has an unnecessarily high maximum. Thus, if there are three counting elements registering 1,000, 10,000 and 100,000 cubic feet per revolution respectively it may be unnecessary and time consuming for the indicator recorder to have to apply impulses to a maximum of 100,000. The maximum of the counting device may be varied in a simple manner by adding further depressions such as 52a to give an equally spaced series of depressions on the counting element 12c. Thus, if there are two such depressions diametrically opposed, the effective maximum count would be 50,000. With five equally spaced depressions the maximum count would be 20,000.

The meter reader may thus take a reading without having to gain access to the meter which is itself protected from the elements, while the consumer is provided with a check of the reading through the conventional series of indicator dials on the meter. In buildings, such as blocks of flats, having multiple installations the different pairs of terminals may be grouped together at a common terminal board.

The apparatus used by the meter reader may be further developed to print upon a bill the quantity recorded as consumed and thus further simplify the work of charging for fluid consumed.

What we claim and desire to secure by Letters Patent is:

1. In a fluid meter, means for reading the meter from the remote position comprising, in combination, a rotary drive shaft driven by the meter mechanism, a revolution recording device mounted on the meter and transmission means between the shaft and said device to move the device from a zero position, the transmission means including an eccentric extension fixed to said shaft, an intermediate rotary member having respective engagement means for said eccentric extension and the recording device, impulse means acting upon said intermediate member to increase its speed of rotation over a predetermined arc of its movement when it is moved into said arc by the rotation of said drive shaft, said arcuate movement producing a step-wise rotation of the revolution recording device, reading drive means operatively connected to said recording device and including an electrically energiseable element and circuit breaking means for the isolation of said element, said drive means being energiseable to operate said recording device in a step-wise manner, the circuit breaking means being operable by said recording device to isolate said element when a zero position is reached.

2. Means according to claim 1 wherein said recording device comprises a series of rotary elements movable away from and towards the zero position, each of said elements being operatively associated with a succeeding element and each complete revolution of a preceding element of the series causing a step-wise part of a revolution of its succeeding element, said intermediate member acting directly on the first element of said series.

3. In a fluid meter, means for reading the meter from a remote position comprising a series of rotary elements movable away from and towards a zero position, preceding elements of the series being operatively associated with their respective succeeding elements so that each complete revolution of a preceding element causes a step-wise part-revolution of its succeeding element, transmission means to said series actuated by the flow of fluid through the meter, and including a rotary drive shaft rotated by said flow and an intermittent motion mechanism driven by the shaft, said intermittent mechanism being actuable by said drive shaft to produce a movement during a predetermined part of each revolution of the drive shaft, the speed of which movement is independent of the speed of rotation of the drive shaft, said movement actuating a step-wise part-revolution of a first element of the series to move it away from its zero position, reading drive means operatively connected to said recording device and including an electrically energiseable element and circuit breaking means for the isolation of said element, said drive means being energiseable to operate said recording device in a step-wise manner, the circuit breaking means being operable by said recording device to isolate said element when a zero position is reached.

4. In a fluid meter, means for reading the meter from a remote position comprising a series of rotary elements movable away from and towards a zero position, each of said elements being operatively associated with a succeeding element and each complete revolution of a preceding element of the series causing a step-wise part of a revolution of its succeeding element, transmission means actuated by the flow of fluid through the meter to operate said series, said transmission means including a rotary drive shaft and an intermittent motion mechanism driven thereby and producing a movement during a predetermined part of each revolution of the drive shaft, the speed of which movement is independent of the speed of rotation of the drive shaft, said mechanism engaging a first element or the series during said movement to cause a step-wise part-revolution thereof away from its zero position, reading drive means operatively associated with said recording device and including an electrically energiseable element and circuit breaking means for the isolation of said element, said drive means being energiseable to rotate the first member of said series in a step-wise manner and in the opposite sense to the rotation actuated by said transmission means, the circuit breaking means being operable by said recording device to isolate said element when the series are returned to their zero position.

5. Means according to claim 4 wherein the electrically energiseable element comprises a solenoid in series with the circuit breaking means, said solenoid being operatively connected to a rocker arm having first and second spaced detents pivoted adjacent to said first member and on a parallel axis thereto, energisation of the solenoid pivoting said arm to move the first detent away from said first element and the second detent into engagement with said first element to rotate it, de-energisation of the solenoid returning the second detent out of engagement with said first element and bringing the first detent into engagement with said first element to index the element, said arm having limited freedom of movement about its pivot to permit rotation of said first element by the intermittent motion mechanism while the first detent is engaged by said element.

6. In a fluid meter, means for reading the meter from a remote position comprising, in combination, a rotary drive shaft driven by the meter mechanism, an intermediate rotary member actuated by said shaft, a revolution recording device comprising a series of rotary elements movable away from and towards a zero position, each of said elements being operatively associated with a succeeding element and each complete revolution of a preceding element of the series causing a step-wise part of a revolution of its succeeding element, the first element being operated by the output from said rotary member and reading drive means independently actuable to also operate said first element, impulse means acting on said intermediate member to increase its speed of rotation over a predetermined arc of its movement when it enters said arc under the actuation of said shaft, its speed of travel through said arc being independent of the rate of rotation of said shaft, a transmitting arm operatively connected to said recording device being engaged by said intermediate member as it moves through said arc to cause a step-wise rotation of said recording device from the zero position thereof, the reading drive means including an electrically energisable element and circuit breaking means for the isolation of said element, said element being operatively associated with said transmitting arm, said arm being thereby actuable by energisation of said element to cause a step-wise rotation of said recording device, the circuit breaking means being operable by said recording device to isolate said element when the zero position is reached.

7. Means according to claim 6 wherein said intermediate member and said energisable element both act upon said arm to cause rotation of said recording device in one direction, the circuit breaking means including a breaker member and a switch bar traversing the elements of said series, resilient means urging said bar into contact with peripheral bands thereof, the peripheral band of each element save the last element of the series comprising a major circular portion and a minor indented portion, said last element having at least two equally spaced indented portions, the circuit breaking means being controlled by the position of the switch bar so that when the bar is in contact with at least one of said circular portions the breaker member is closed and when it is in contact with one indented portion of said last element and said indented portions of the other elements of the series the breaker member is open.

8. In a fluid meter, means for reading the meter from a remote position comprising, in combination, a rotary drive shaft driven by the meter mechanism, a revolution recording device mounted on the meter and transmission means between the shaft and said device to move the device from a zero position, the transmission means including an intermittent motion mechanism driven by said shaft, said mechanism being actuable by said shaft to produce a movement during a predetermined part of each revolution of the shaft the speed of which movement is independent of the speed of rotation of the shaft, said movement actuating a step-wise rotation of the revolution recording device, reading drive means including a solenoid and circuit breaking means for the solenoid, a drive connector between the solenoid and the revolution recording device, energisation and de-energisation of the solenoid causing a reciprocating motion of said connector to produce a step-wise rotation of the revolution recording device to move it upwards a zero position.

9. Means according to claim 8 wherein the intermittent motion mechanism is operatively associated with the drive connector, said connector transmitting impulses both from the meter and from the solenoid to the revolution recording device.

10. Means according to claim 8 wherein the intermittent motion mechanism includes an output member to be rotated at said independent speed and wherein the revolution recording device comprises a series of rotary elements movable away from and towards a zero position, a first element of the series receiving the drive to the series, said first element being engaged by said output member to move the series away from the zero position and by said drive connector to return the series towards the zero position.

References Cited in the file of this patent

UNITED STATES PATENTS

| | | |
|---|---|---|
| 957,082 | Nash | May 3, 1910 |
| 2,973,899 | Hegner | Mar. 7, 1961 |